(12) United States Patent
Smith

(10) Patent No.: US 10,690,194 B2
(45) Date of Patent: Jun. 23, 2020

(54) CLUTCH ASSEMBLY, KIT, AND METHOD

(71) Applicant: Mason Morris Smith, St. John, IN (US)

(72) Inventor: Mason Morris Smith, St. John, IN (US)

(*) Notice: Subject to any disclaimer, the term of this patent is extended or adjusted under 35 U.S.C. 154(b) by 20 days.

(21) Appl. No.: 15/477,255

(22) Filed: Apr. 3, 2017

(65) Prior Publication Data

US 2018/0283466 A1 Oct. 4, 2018

(51) Int. Cl.
*F16D 13/64* (2006.01)
*F16D 13/70* (2006.01)
*F16D 13/75* (2006.01)
*F16D 13/68* (2006.01)

(52) U.S. Cl.
CPC ......... *F16D 13/648* (2013.01); *F16D 13/683* (2013.01); *F16D 13/70* (2013.01); *F16D 13/757* (2013.01); *F16D 2250/003* (2013.01); *F16D 2250/0084* (2013.01); *F16D 2300/12* (2013.01)

(58) Field of Classification Search
CPC ........ F16D 13/52; F16D 13/70; F16D 13/648; F16D 13/757; F16D 2250/003; F16D 2250/0084
See application file for complete search history.

(56) References Cited

U.S. PATENT DOCUMENTS

| 5,038,904 | A * | 8/1991 | Miller | F16D 13/52 192/70.2 |
| 5,322,148 | A * | 6/1994 | Fernandez | F16D 13/52 192/70.13 |
| 8,857,592 | B2 * | 10/2014 | Mangiagli | F16D 13/683 192/70.13 |
| 2007/0215428 | A1 * | 9/2007 | Capito | B60K 23/0808 192/35 |
| 2010/0044179 | A1 * | 2/2010 | Nakamura | F16D 13/52 192/58.2 |

* cited by examiner

*Primary Examiner* — David J Hlavka
(74) *Attorney, Agent, or Firm* — Hartman Global IP Law; Gary M. Hartman; Domenica N. S. Hartman

(57) ABSTRACT

Clutch kits and methods for converting a stock clutch assembly and the clutch assemblies resulting therefrom. Such a method entails modifying a stock clutch assembly comprising a stock drum and stock friction and driving plates installed in an interior cavity of the drum. The method includes securing a pressure plate to the drum with threads to enclose stock or modified friction and driving plates within the interior cavity of the drum. The pressure plate can be configured to axially externally extend the interior cavity of the drum so that additional friction and/or driving plates may accommodated within the interior cavity.

15 Claims, 17 Drawing Sheets

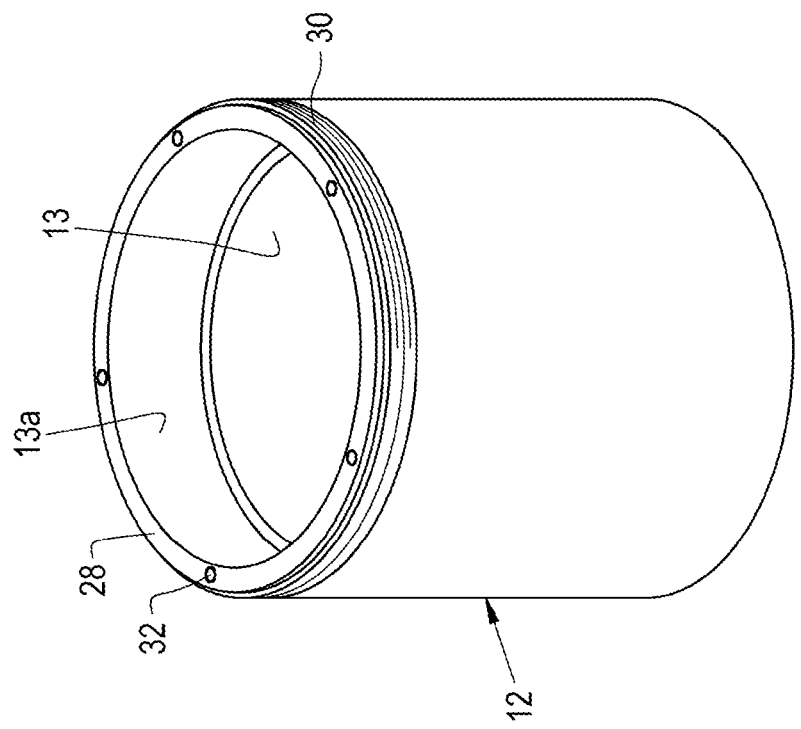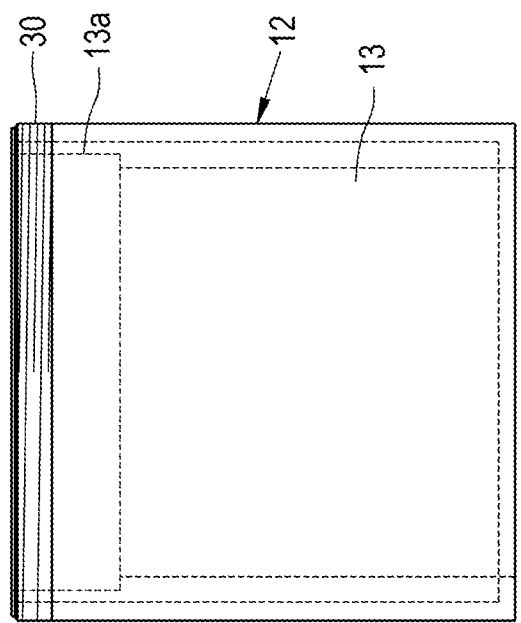
FIG. 4

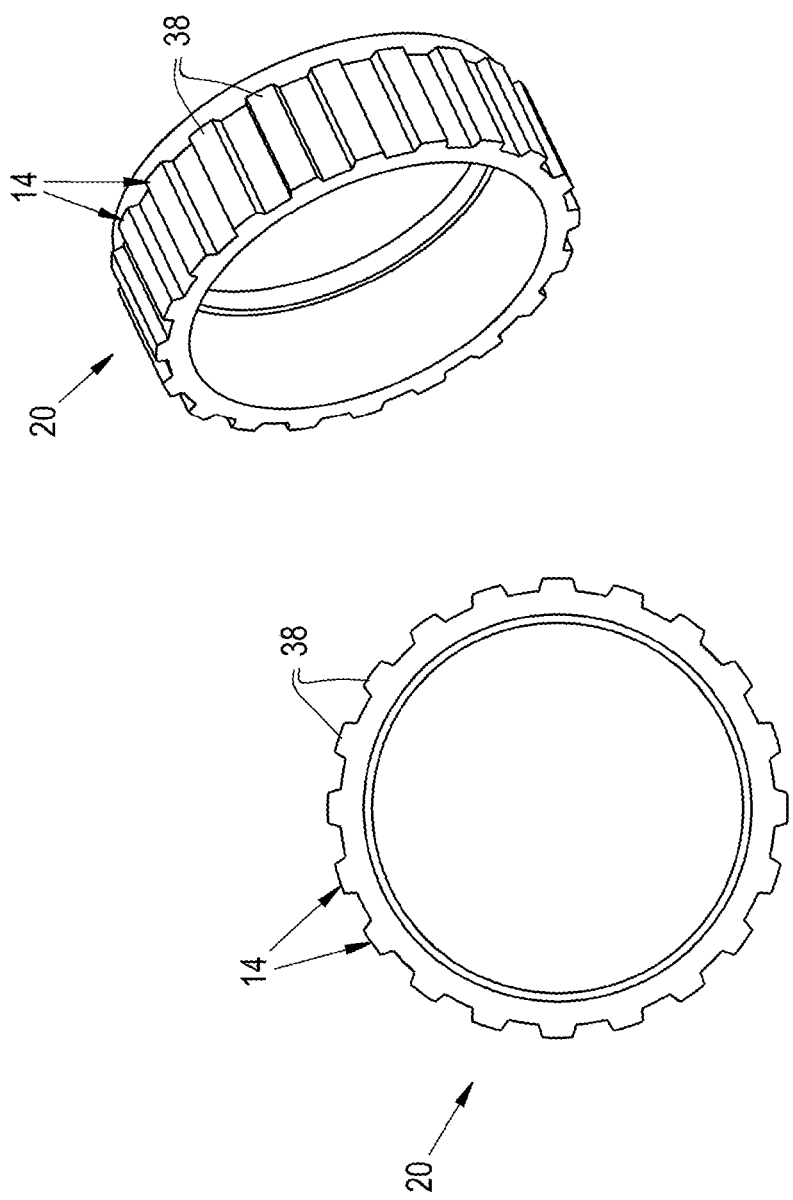

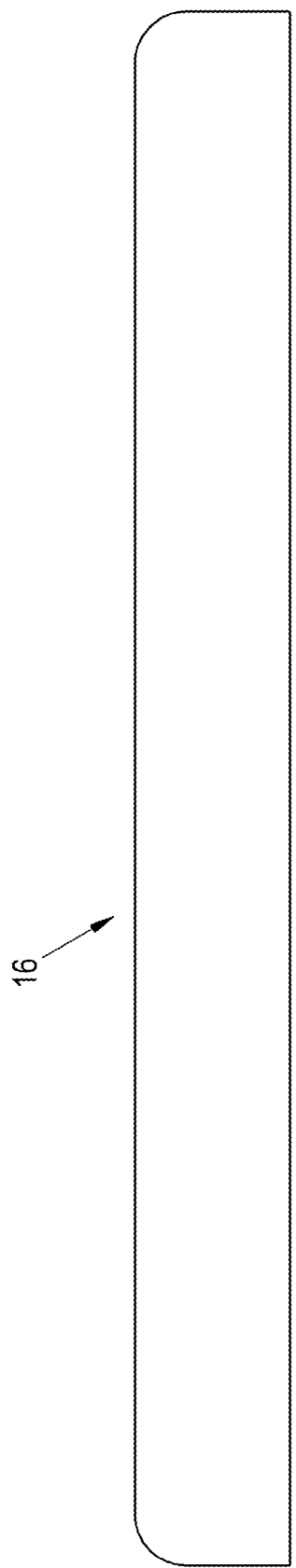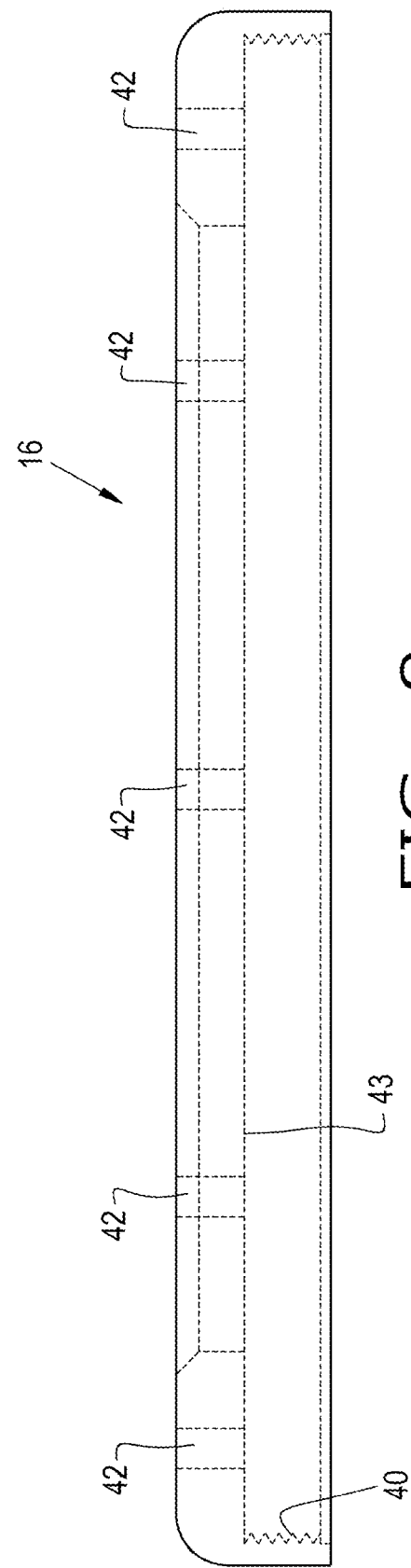

CLUTCH ASSEMBLY, KIT, AND METHOD

BACKGROUND OF THE INVENTION

The present invention generally relates to clutches, and in particular to clutch assemblies and to kits and methods capable of increasing certain performance characteristics of clutch assemblies.

Transmissions (or drivetrains) of types used in on-road and off-road motor vehicles typically include one or more clutch assemblies by which the transfer of power from an engine or motor to the drive wheels of a vehicle can be interrupted. In particular, a clutch assembly enables power transmission between an input (driving) shaft and an output (driven) shaft to be mechanically engaged and disengaged. Friction clutches are a common type of clutch assembly that typically comprise a stack of driving members interleaved with driven members. To promote power transmission, at least some of these members, or "plates," typically have a friction material on one or both of their axial surfaces ("friction faces"), which engage axial surfaces of immediately adjacent plates. The number, size, mass, rigidity, and materials of the plates are factors that determine how much torque can be transferred through a clutch assembly. If torque applied to a clutch assembly exceeds the capability of its plates, heating and/or slippage may occur that can reduce the performance of the assembly and lead to wear of the friction faces of the plates and possibly premature failure of the clutch assembly. Consequently, there is an ongoing interest in techniques capable of increasing the torque capabilities of friction clutch assemblies.

BRIEF DESCRIPTION OF THE INVENTION

The present invention provides clutch assemblies capable of exhibiting desirable performance characteristics, as well as clutch kits and methods for converting stock clutch assemblies to attain desirable performance characteristics.

According to one aspect of the invention, a method is provided for modifying a stock clutch assembly comprising a stock drum and stock friction and driving plates installed in an interior cavity of the stock drum. The method includes securing a pressure plate to the stock drum with threads to enclose the stock friction and driving plates within the interior cavity of the stock drum. The pressure plate preferably has a recessed surface adapted to be contacted by one of the friction and driving plates and to axially externally extend the interior cavity of the drum so that additional friction and/or driving plates may be accommodated within the interior cavity. The method may also include replacing a stock apply plate of the clutch assembly with a replacement apply plate that is configured to enable the drum to accommodate additional friction and/or driving plates within its interior cavity. Optionally, the method may also entail replacing the stock friction and driving plates with replacement friction and driving plates that have larger outer diameters and/or smaller inner diameters than the stock friction and driving plates, in which case the method may further include machining the stock drum to increase an inner diameters of its interior cavity to accommodate the replacement friction and driving plates, and replacing a stock apply plate of the clutch assembly with a replacement apply plate that has an outer diameter and/or an inner diameter sized to mechanically couple with the replacement friction and/or driving plates.

According to another aspect of the invention, a clutch assembly comprises a drum having an interior cavity, friction and driving plates installed in the interior cavity, and a pressure plate secured to the drum with threads to enclose the friction and driving plates within the interior cavity of the drum. The pressure plate has a surface adapted to be contacted by one of the friction and driving plates and to axially externally extend the interior cavity of the drum so that additional friction and/or driving plates may be accommodated within its interior cavity relative to an equivalent stock drum. The clutch assembly may further comprise an apply plate also configured to enable the drum to accommodate additional friction and/or driving plates within its interior cavity relative to an equivalent stock drum. Optionally, the interior cavity of the drum may be modified to accommodate replacement friction and driving plates that have larger outer diameters and/or smaller inner diameters than stock friction and driving plates, in which case the clutch assembly preferably includes a replacement apply plate having an outer diameter and/or an inner diameter sized to mechanically couple with the larger friction and/or driving plates.

According to still another aspect of the invention, a kit is provided for modifying a clutch assembly that comprises a drum and stock friction and driving plates installed in an interior cavity of the drum. The kit includes a pressure plate configured to be secured to the drum with threads to enclose the stock friction and driving plates within the interior cavity of the drum. The pressure plate is preferably configured to axially externally extend the interior cavity of the drum so that additional friction and/or driving plates may be accommodated within its interior cavity relative to an equivalent stock drum. The kit preferably also includes a replacement apply plate for replacing a stock apply plate of the clutch assembly, wherein the replacement apply plate is configured to enable the drum to accommodate additional friction and/or driving plates within its interior cavity. Optionally, the kit may further include replacement friction and driving plates that have larger outer diameters and/or smaller inner diameters than the stock friction and driving plates, in which case the replacement apply plate has an outer diameter and/or an inner diameter sized to mechanically couple with the replacement friction and/or driving plates.

Other aspects of the invention include means for calibrating the extent to which the pressure plate is threaded onto the drum, and machining a stock ring gear to have an outer diameter sized to mechanically couple with the replacement friction plates.

Technical aspects of clutch assemblies, kits, and methods as described above preferably include the ability to improve the performance of a stock clutch assembly, including increasing the upper toque limit of the assembly, by increasing the number of stock friction and/or driving plates that can be accommodated within the drum relative to an equivalent stock drum, and/or increasing the friction surface areas provided by friction faces of friction and driving plates in proportion to stock plates installed in an equivalent stock drum.

Other aspects and advantages of this invention will be further appreciated from the following detailed description.

BRIEF DESCRIPTION OF THE DRAWINGS

FIG. 4 schematically represents isolated side and perspective views showing the modified drum of FIGS. 1 and 2.

FIG. 7 schematically represents isolated front and perspective views showing the ring gear of FIGS. 1 and 2.

FIGS. 8, 9, 10 and 11 schematically represent isolated side, cross-sectional, and perspective sectional views, respectively, showing the pressure plate of FIGS. 1 and 2.

DETAILED DESCRIPTION OF THE INVENTION

Figure 1:
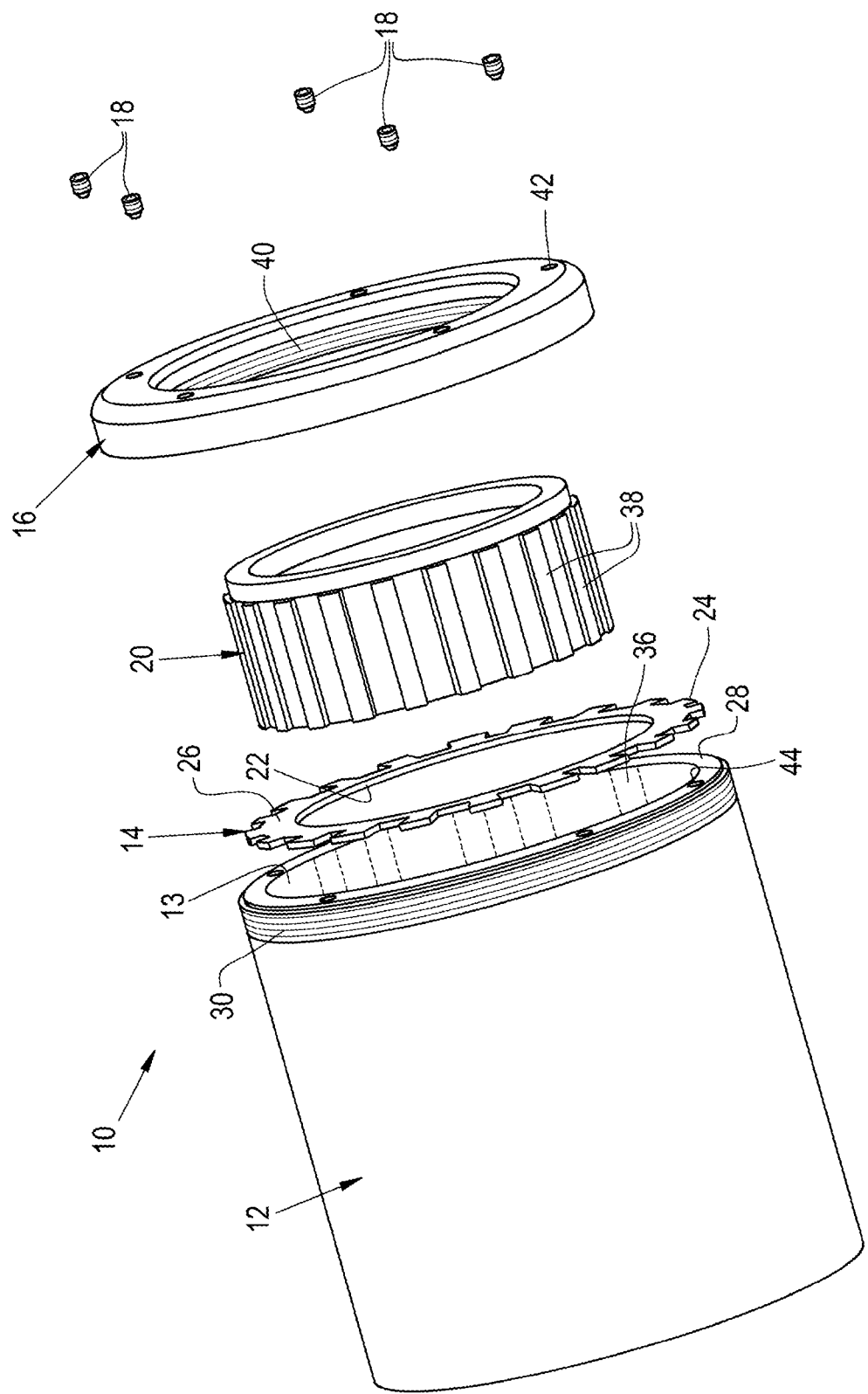
FIGS. 1 and 2 are exploded perspective and side views, respectively, showing components of a modified clutch assembly, including a modified drum, a replacement clutch (driving) plate, a ring gear, and a pressure plate in accordance with a nonlimiting embodiment of the invention.

The invention will be described below in reference to a particular clutch assembly and components shown in the drawings. While certain components of the clutch assembly may be associated with particular transmissions, for example, a line of transmissions in commercial use and known as General Motors Turbo Hydra-Matic® (THM) transmissions 700R4, 4L60, 4L60E, 4L65E, 4L70E, and 4L79E, it will be appreciated that aspects and teachings of the invention are generally applicable to other transmissions. More generally, the invention is applicable to clutch assemblies for use in transmissions (drivetrains) of types used in on-road and off-road motor vehicles to interrupt the transfer of power from an engine (motor) to the drive wheels of a vehicle, and particularly to provide the mechanical means to selectively enable and disable power transmission between an input (driving) shaft and a driven shaft of a transmission.

Figure 2:
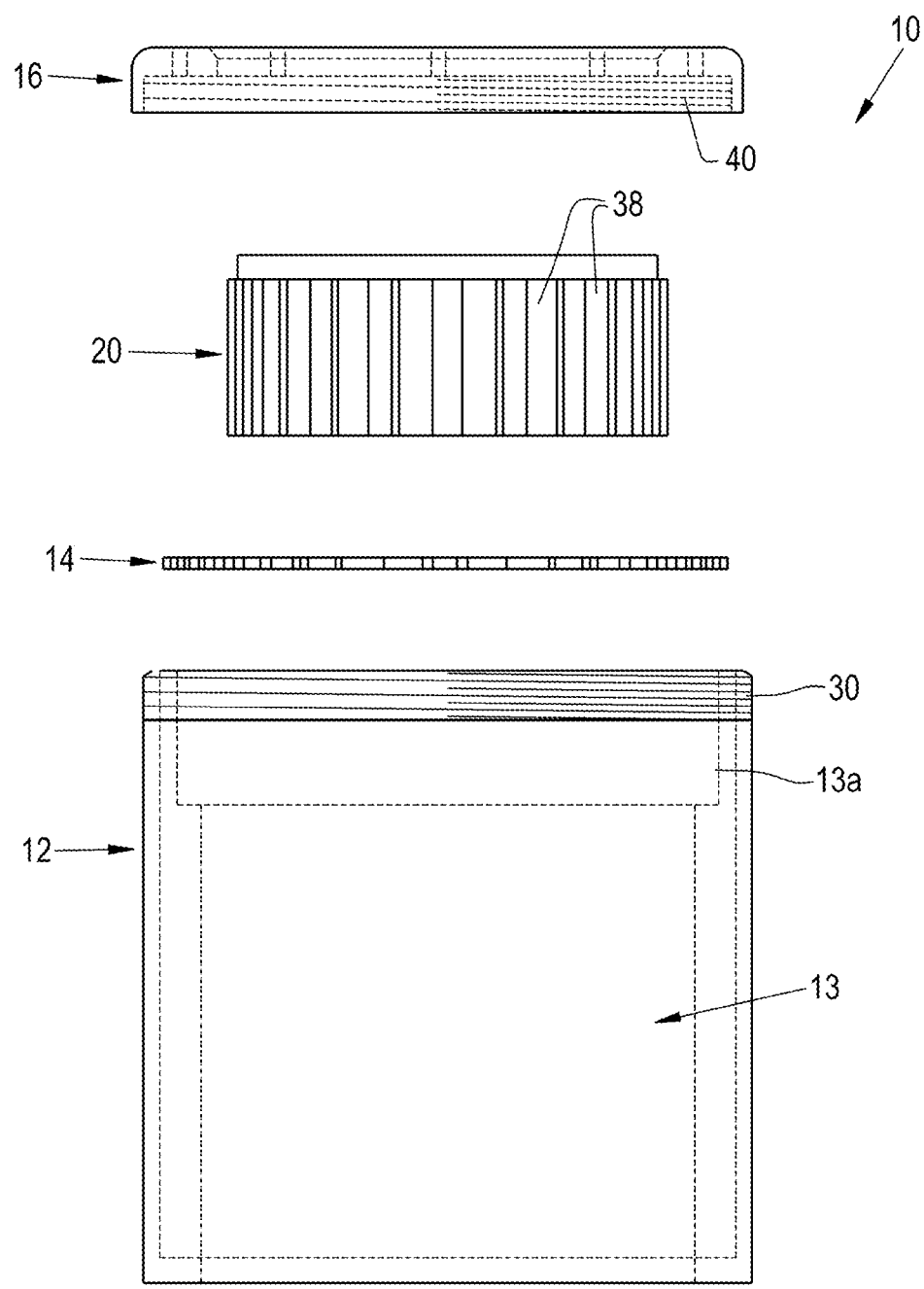

The drawings schematically represent a limited portion and certain components of a clutch assembly (hereinafter referred to as a clutch assembly 10). The clutch assembly 10 is represented as a type commonly referred to as a friction clutch, and is particularly represented as comprising an input housing or drum 12 that might be installed in one of the aforementioned Turbo Hydra-Matic® transmissions. The clutch assembly 10 comprises a stack of interleaved driving and driven members, or plates (generally referred to herein as "clutch plates" or simply "plates"), of which a single plate 14 is shown in FIGS. 1 and 2. The plates 14 are housed in the drum 12, which has a generally cylindrical exterior shape and a generally cylindrical interior cavity 13. If configured for installation in a Turbo Hydra-Matic® transmission, the cavity 13 is adapted to house forward clutch packs of the transmission, of which the plates 14 are components of what is commonly referred to as the third and fourth (3/4) clutch pack. Also shown in FIGS. 1 and 2 are a pressure plate 16 for retaining the plates 14 within the drum cavity 13, and a ring gear 20 through which rotational motion of the clutch assembly 10 about its axis is output to an output (driven) shaft (not shown).

Each clutch plate 14 generally has a ring (annular) disk shape that defines an inner perimeter 22, an outer perimeter 24, and oppositely-disposed axial surfaces ("friction faces") 26. To promote power transmission between adjacent plates 14, at least some of the plates 14 have a friction material on one or both of their friction faces 26, which engage the friction faces 26 of one or two immediately adjacent plates 14. The clutch plates 14 bearing a friction material will be referred to herein as friction plates 14, whereas other plates 14 (including the plate 14 shown in FIGS. 1 and 2) will be referred to herein as driving plates 14. The rotation of the drum 12 is transferred to the driving plates 14 as a result of mechanical coupling between the drum 12 and driving plates 14, transferred to the friction plates 14 via friction coupling between the driving and friction plates 14, and transferred to the ring gear 20 as a result of mechanical coupled between the friction plates 14 and ring gear 20, all of which is accomplished in a manner well understood by those knowledgeable in the art.

Because the number, size, mass, rigidity, and materials of the plates 14 are factors that determine how much torque can be transferred through the clutch assembly 10, one aspect of the invention is to enable the use of more and/or thicker plates 14 in the clutch assembly 10, and another aspect of the invention is to enable the surface areas of the friction faces 26 of the plate 14 to be increased relative to stock plates of a similar type of clutch assembly, for example, as a result of the drum 12, plates 14, pressure plate 16, and/or ring gear 20 being particularly configured for this purpose. These aspects can be individually used or combined to allow for higher torque levels before excessive heating and/or slippage occurs between the plate 14. As discussed below, embodiments of the invention use "modified" components that differ from "stock" components as discussed below, permit certain modified components to be fabricated from stock components, and in some embodiments permit the use of combinations of modified components and unmodified stock components. As used herein, a "stock" component refers to an OEM component and to aftermarket components intended to be interchangeable therewith.

The following discussion will describe a particular non-limiting embodiment that combines both of the above-noted aspects of the invention, in which at least the pressure plate 16 is configured to permit more plates 12 and/or 14 to be assembled in the drum 12, and the plates 14 are manufactured to have friction faces 26 whose surface areas are relatively larger in proportion to the drum 12 than stock plates installed in an equivalent stock drum as a result of the plates 14 having smaller inner diameters defined by their inner perimeters 22 and larger outer diameters defined by their outer perimeters 24. In preferred embodiments, an increase in surface area of more than 200% can be achieved in this manner, though lesser and greater increases are foreseeable. It is also foreseeable that relatively larger surface areas for the friction faces 26 could be attained by either decreasing their inner diameters or increasing their outer diameters.

Figure 3:
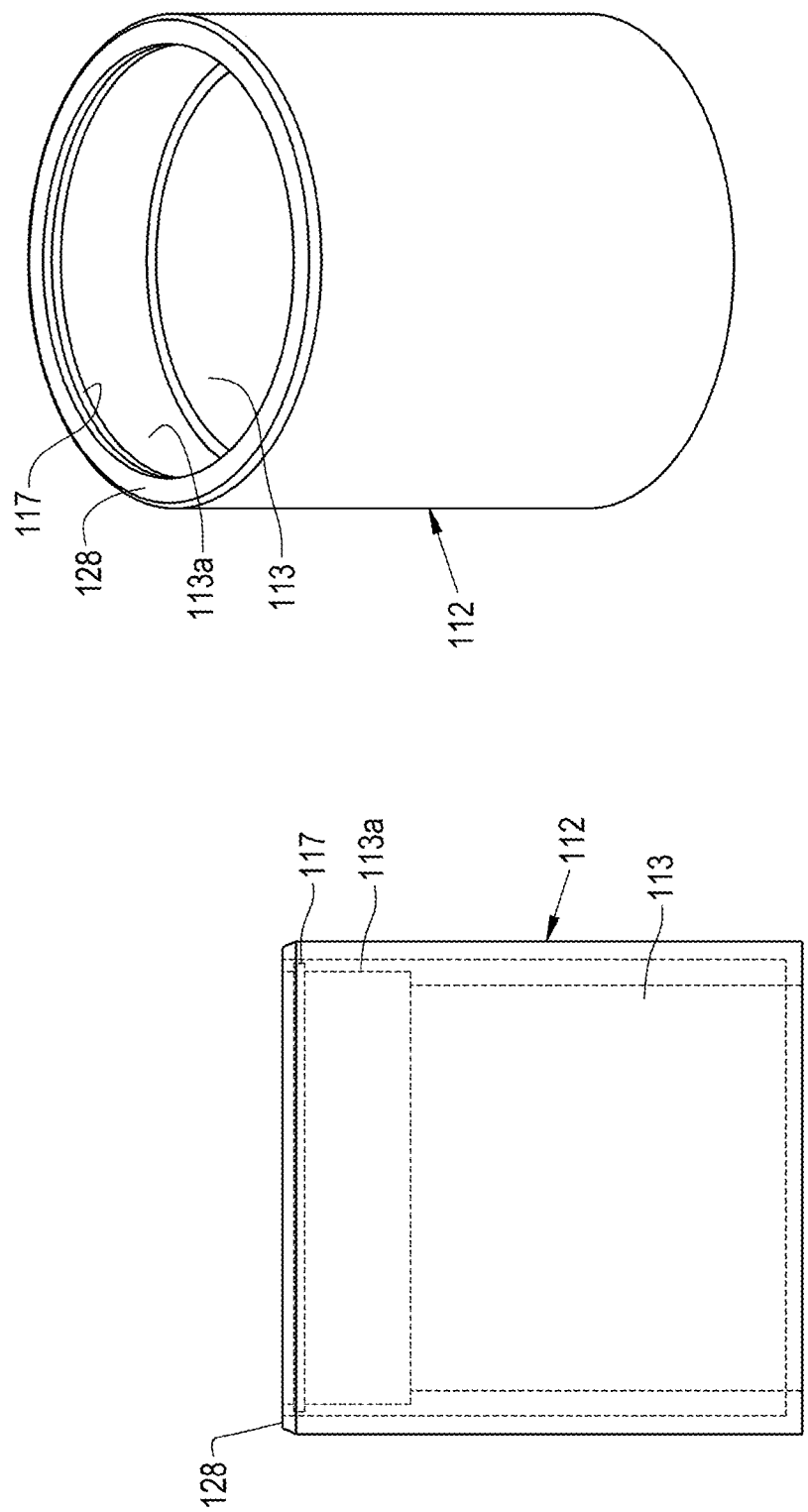
FIG. 3 schematically represents side and perspective views of an original equipment (stock) drum of a type from which the modified drum of FIGS. 1 and 2 can be fabricated.
Figure 17:
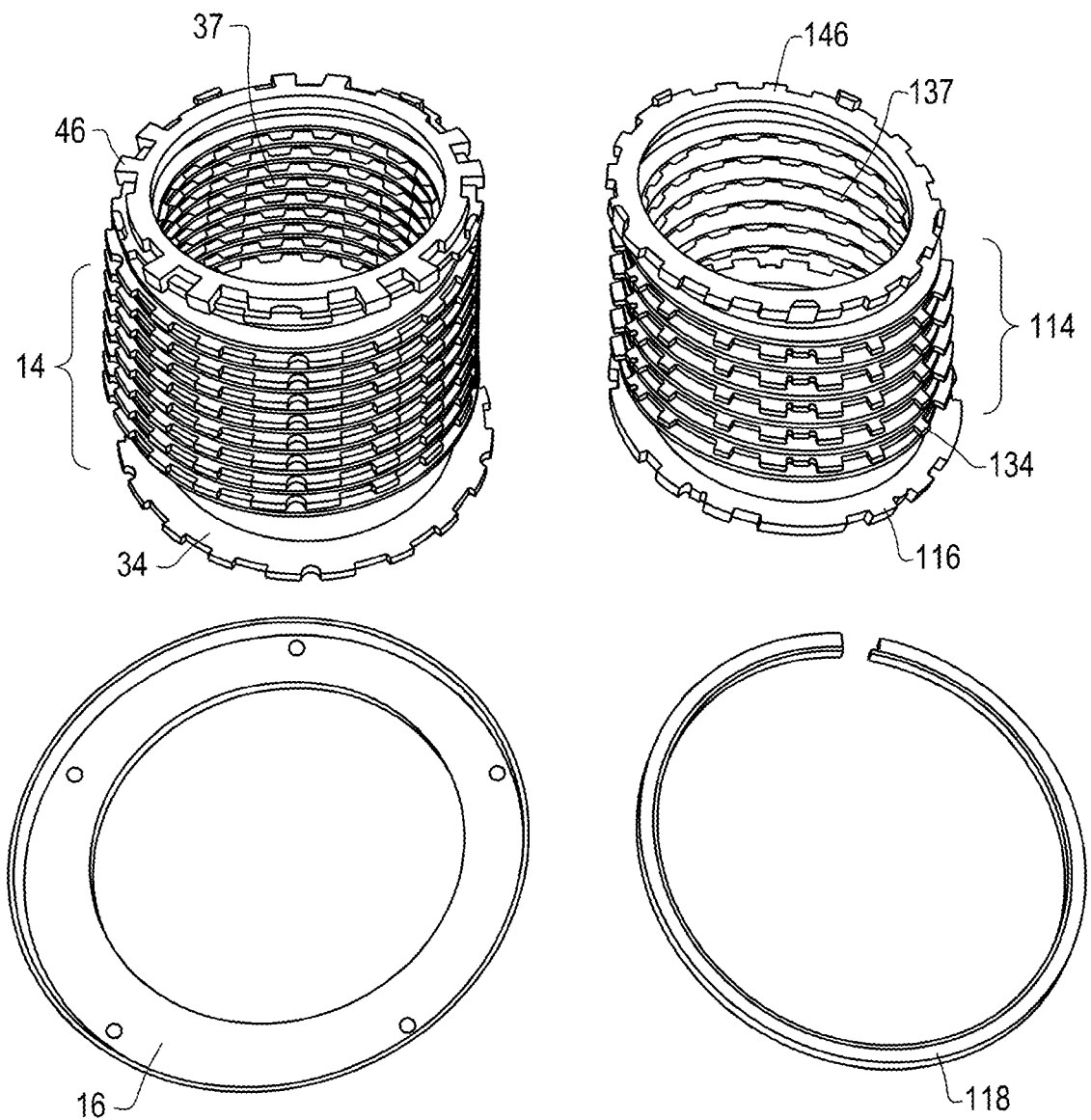
FIGS. 17 and 18 are images that each show a pressure plate of the type shown in FIGS. 1, 2, and 8 through 11 and a stack of replacement friction and driving plates sized for installation in the drum of FIG. 16, alongside a snap ring of a type for assembling with a stock drum as represented in FIG. 3 and a stack of stock friction and driving plates sized for installation in the stock drum of FIG. 3.
Figure 18:
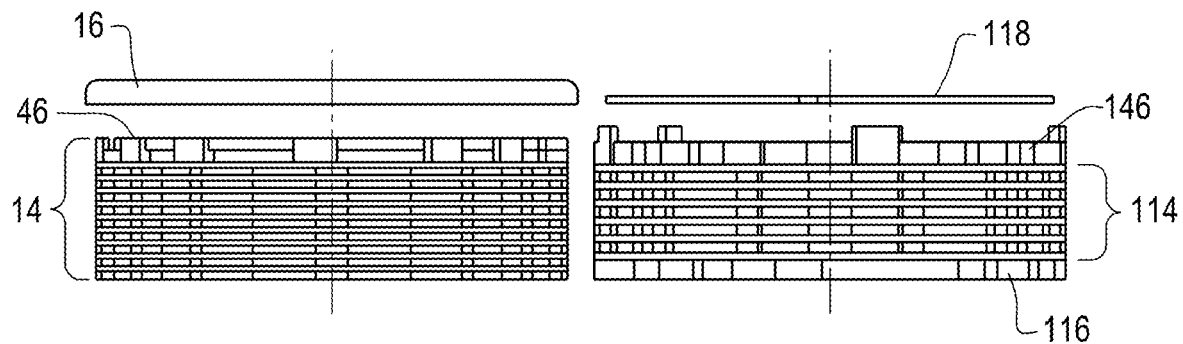

FIG. 3 schematically represents a stock drum 112 and depicts a portion 113*a* of its interior cavity 113 as sized to accommodate an axially aligned stack of interleaved friction and driving plates (114 in FIGS. 17 and 18) and pressure plate (116 in FIGS. 17 and 18). The drum 112 retains the plates 114 and 116 in the cavity portion 113*a* with a snap ring (118 in FIGS. 17 and 18) placed in a snap ring groove 117 adjacent a rim 128 at the entrance to the cavity 113. FIG. 4 schematically represents the drum 12 of FIGS. 1 and 2 produced as a result of machining the drum 112 of FIG. 3 to increase the inner diameter defined by its cavity portion 113*a*, and machining threads 30 on the outer cylindrical surface of the drum 113 adjacent its rim 128. In the particular embodiment shown, the rim 128 of the drum 112 has also been machined to eliminate the snap ring groove 117. Furthermore, dimples 32 have been machined in the surface of the rim 28 of the drum 12 for purposes of retaining the pressure plate 16, as discussed below.

Figure 5:
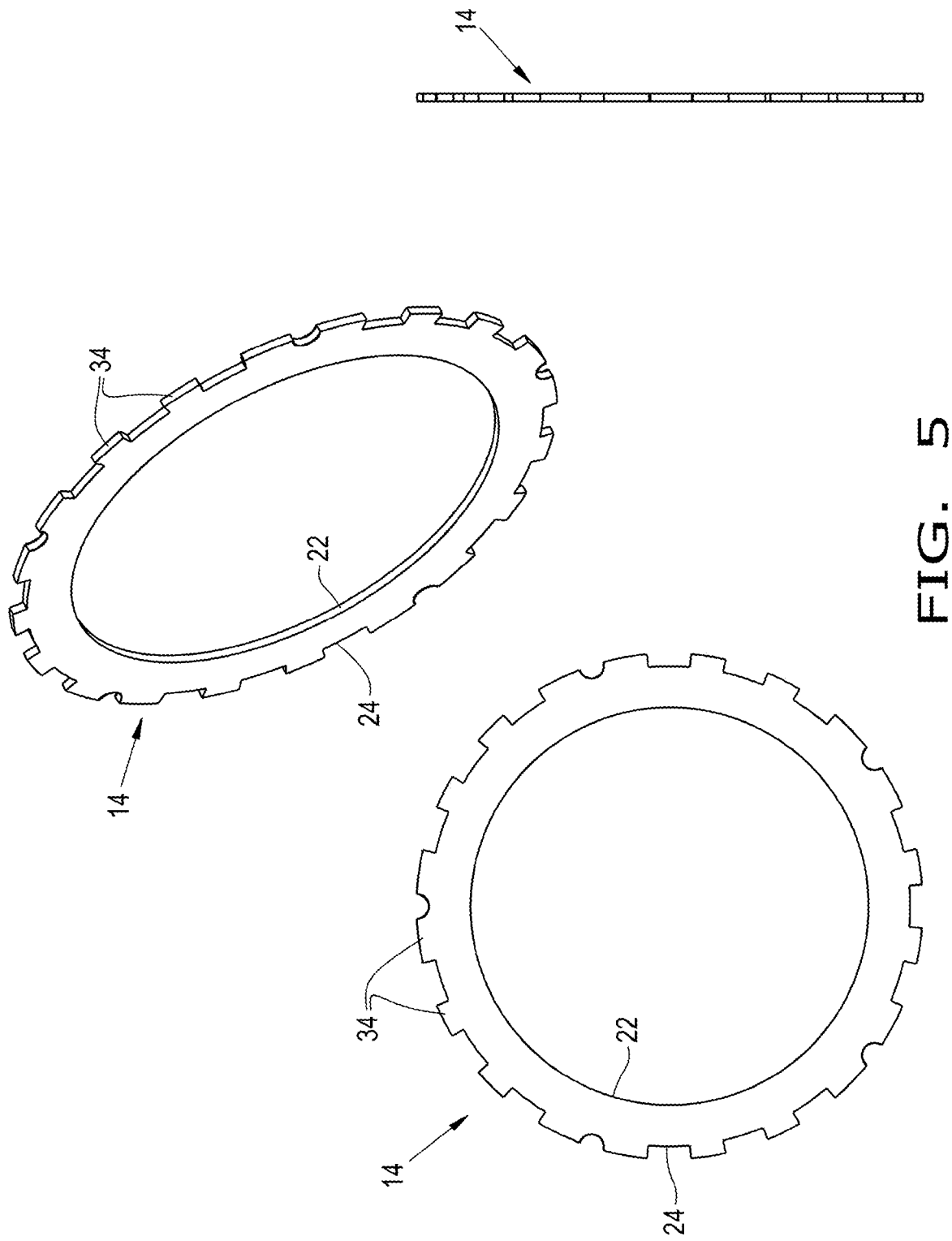
FIG. 5 schematically represents isolated front, side, and perspective views showing the replacement clutch (driving) plate of FIGS. 1 and 2.
Figure 16:
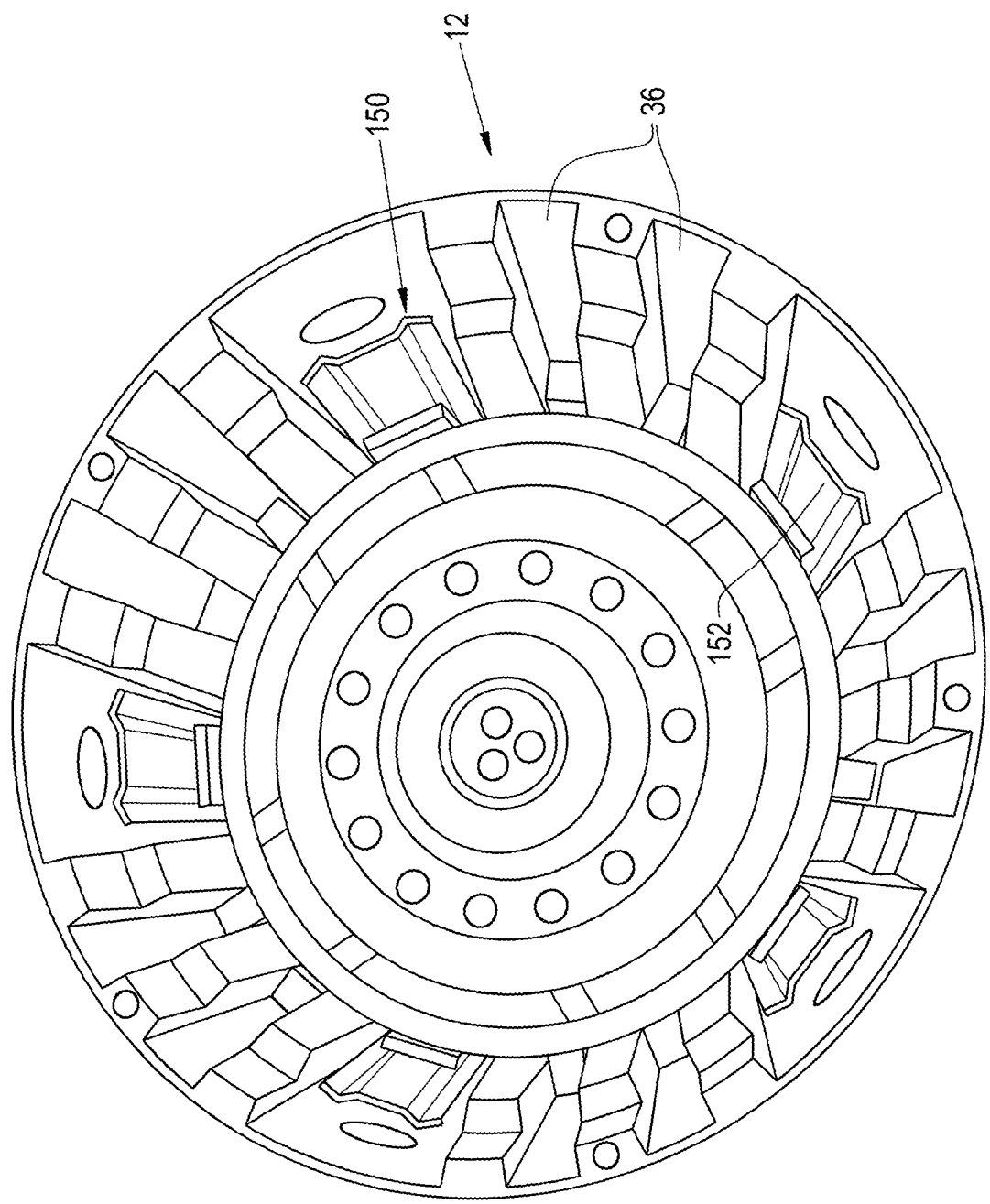
FIG. 16 is an image showing a modified drum of the type shown in FIGS. 1, 2, and 4, along with a stock apply ring installed in the drum.

An example of a driving plate 14 configured for assembly with the drum 12 of FIGS. 1, 2, and 4 is represented in FIG. 5. The plate 14 is machined to have tabs 34 that protrude from its outer perimeter 24 for coupling with complementary slots (36 in FIGS. 16, 19, and 20) formed in the walls of the cavity 13 and cavity portion 13*a* of the drum 12. Notably, the tabs 34 at the outer perimeter 24 of the plate 14 prevent the plate 14 from being received in the cavity portion 113*a* of the stock drum 112 from which the drum 12 was machined. A friction plate 14 sized for use with the driving plate 14 of FIG. 5 has an inner perimeter 22 equipped with teeth (37 in FIGS. 17-21) and an outer perimeter 24 that lacks the tabs 34 of the driving plate 14, but otherwise has inner and outer diameters that approximate those of the driving plate 14, such that in combination the friction and driving plates 14 define relatively large complementary friction faces 26.

Figure 6:
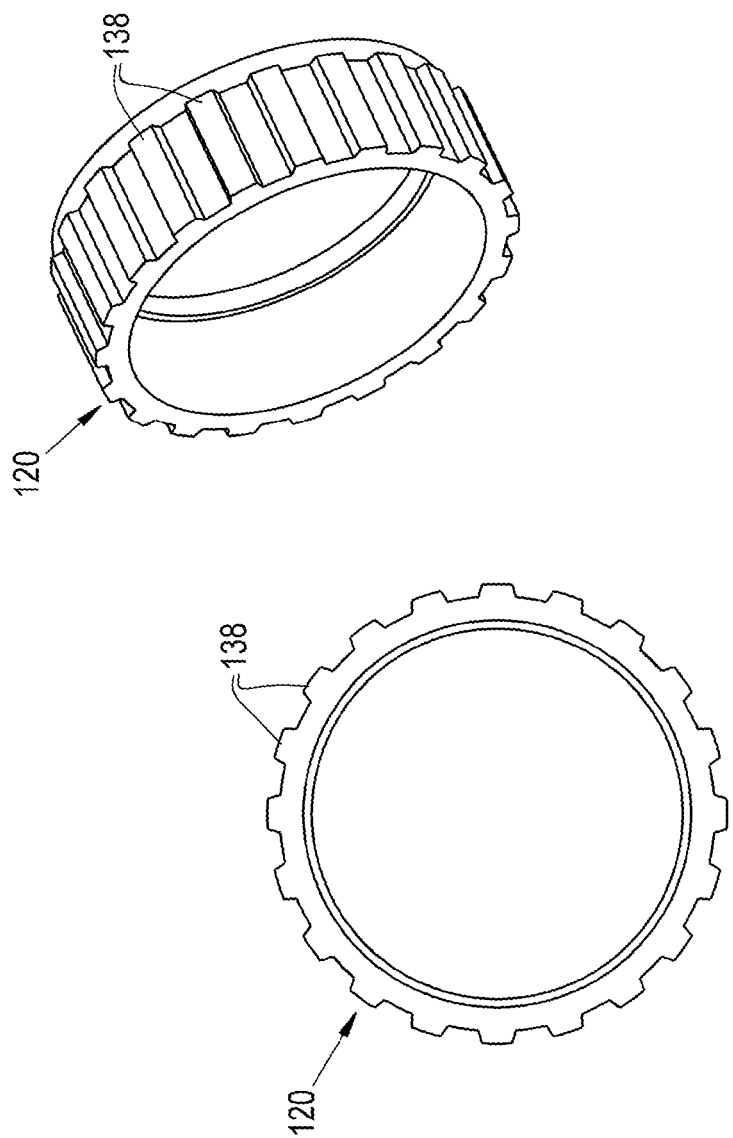
FIG. 6 schematically represents front and perspective views of a stock ring gear of a type from which the ring gear of FIGS. 1 and 2 can be fabricated.
Figure 10:
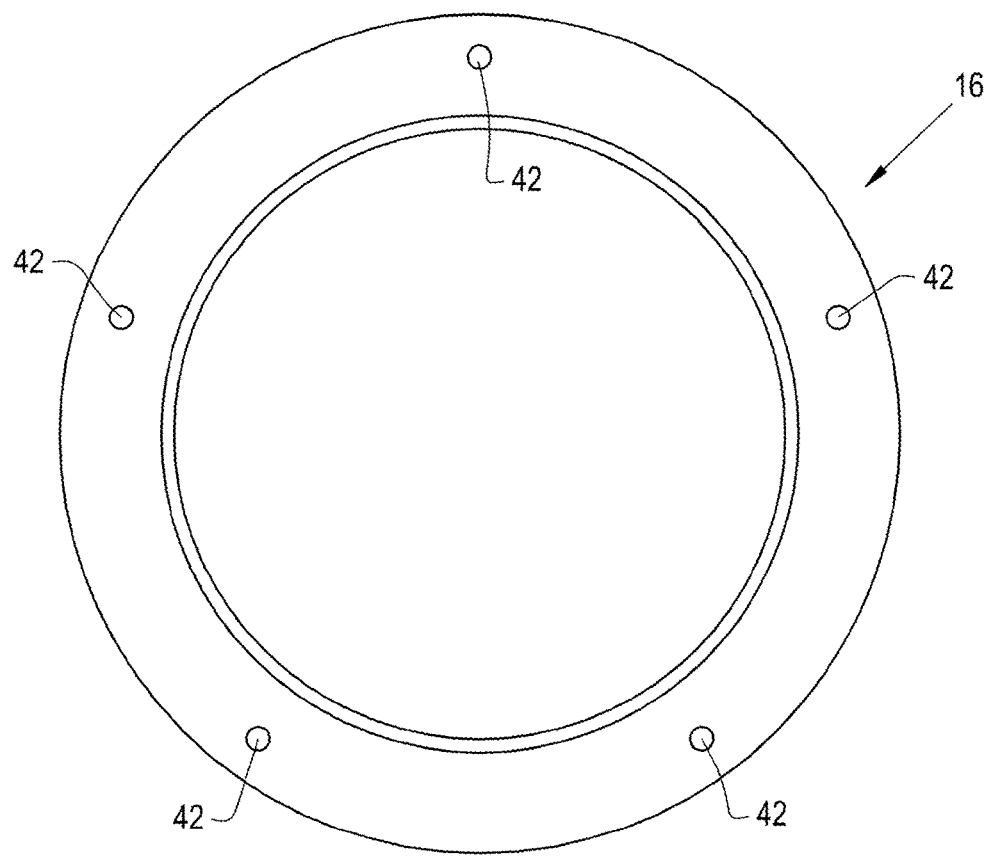
Figure 11:
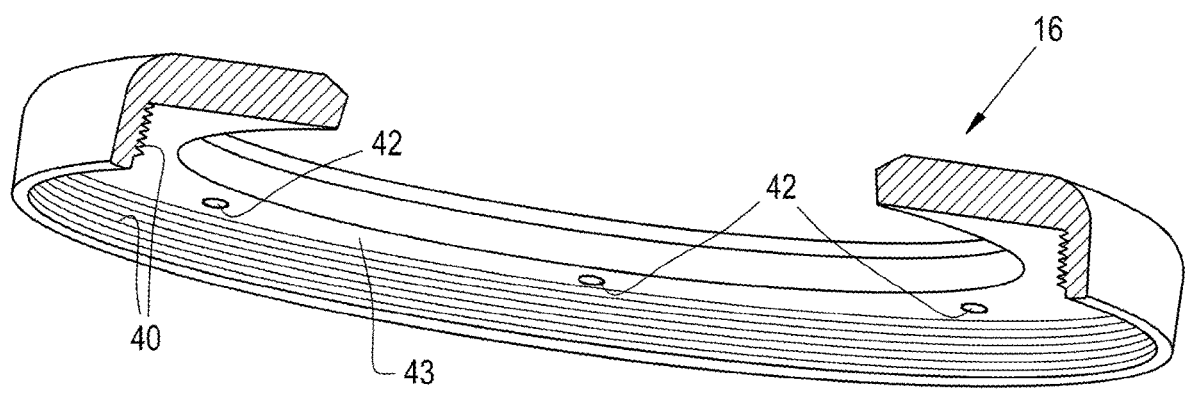

FIG. 6 schematically represents a stock ring gear 120 conventionally fabricated to have helical teeth (not shown) on its inner diameter for mechanically coupling with planet gears, and slotted teeth 138 on its outer diameter for mechanically coupling with friction plates installed in the cavity portion 113*a* of the stock drum 112 of FIG. 3. Because the friction plates 14 to be installed in the modified drum 12 of FIGS. 1, 2, and 4 are intentionally manufactured to have smaller inner diameters that are consequently too small to receive the outer diameter of the stock ring gear 120, FIG. 7 schematically represents the ring gear 20 of FIGS. 1 and 2 produced as a result of machining the teeth 138 of the stock ring gear 120 of FIG. 6 to decrease its outer diameter while maintaining an appropriate profile for the resulting teeth 38 of the ring gear 20. The ring gear 20 does not require any modifications to the helical teeth on its inner diameter.

FIGS. 8-11 schematically represent isolated views of the pressure plate 16 of FIGS. 1 and 2 configured for assembly with the drum 12 of FIGS. 1, 2, and 4. The pressure plate 16 generally replaces the pressure plate 116 and snap ring 118 (FIGS. 17 and 18) of the stock drum 112. The pressure plate 16 is machined to have threads 40 that mate with the threads 30 adjacent the rim 28 of the drum 12. As such, the pressure plate 16 is configured to close the entrance to the drum cavity 13. In addition, the pressure plate 16 has a surface 43 that contacts the last (outermost) plate 14 installed in the drum 12, and the pressure plate 16 applies pressure to the stack of friction and driving plates 14 installed within the cavity portion 13*a*. Additionally, due to providing significantly greater contact surfaces with the drum 12 (via the threads 30 and 40) and the outermost plate 14 (via the surface 43), the pressure plate 16 and its threaded connection to the drum 12 provide a superior thermal path from the plates 14 to the drum 12 and the surrounding environment in comparison to the stock pressure plate 116 and snap ring 118 (FIG. 17) used with the stock drum 112 of FIG. 3. Furthermore, the surface 43 of the pressure plate 16 defines a recessed face that effectively defines an external axial extension of the drum cavity 13*a* (in other words, axial space beyond the rim 28 of the drum 12) to create additional axial space for accommodating additional plates 14 within the cavity 13*a*.

To prevent spin off of the pressure plate 16 due to the rotational motion of the clutch assembly 10 and its drum 12, threaded holes 42 have been machined through the pressure plate 16 to receive set screws 18 (FIG. 1) or other suitable means for locking the pressure plate 16 by engaging recesses or dimples 44 (FIG. 1) formed in the rim 28 of the drum 12. By mutually locating the set screws 18 and dimples 44 at predetermined angular positions relative to the drum 12, the set screws 18 and dimples 44 also provide the capability of calibrating the extent to which the pressure plate 16 is threaded onto the drum 12 to adjust the axial extension of the drum cavity 13*a* defined by the pressure plate 16 and the axial "clutch" clearances between the friction and driving plates 14.

Figure 12:
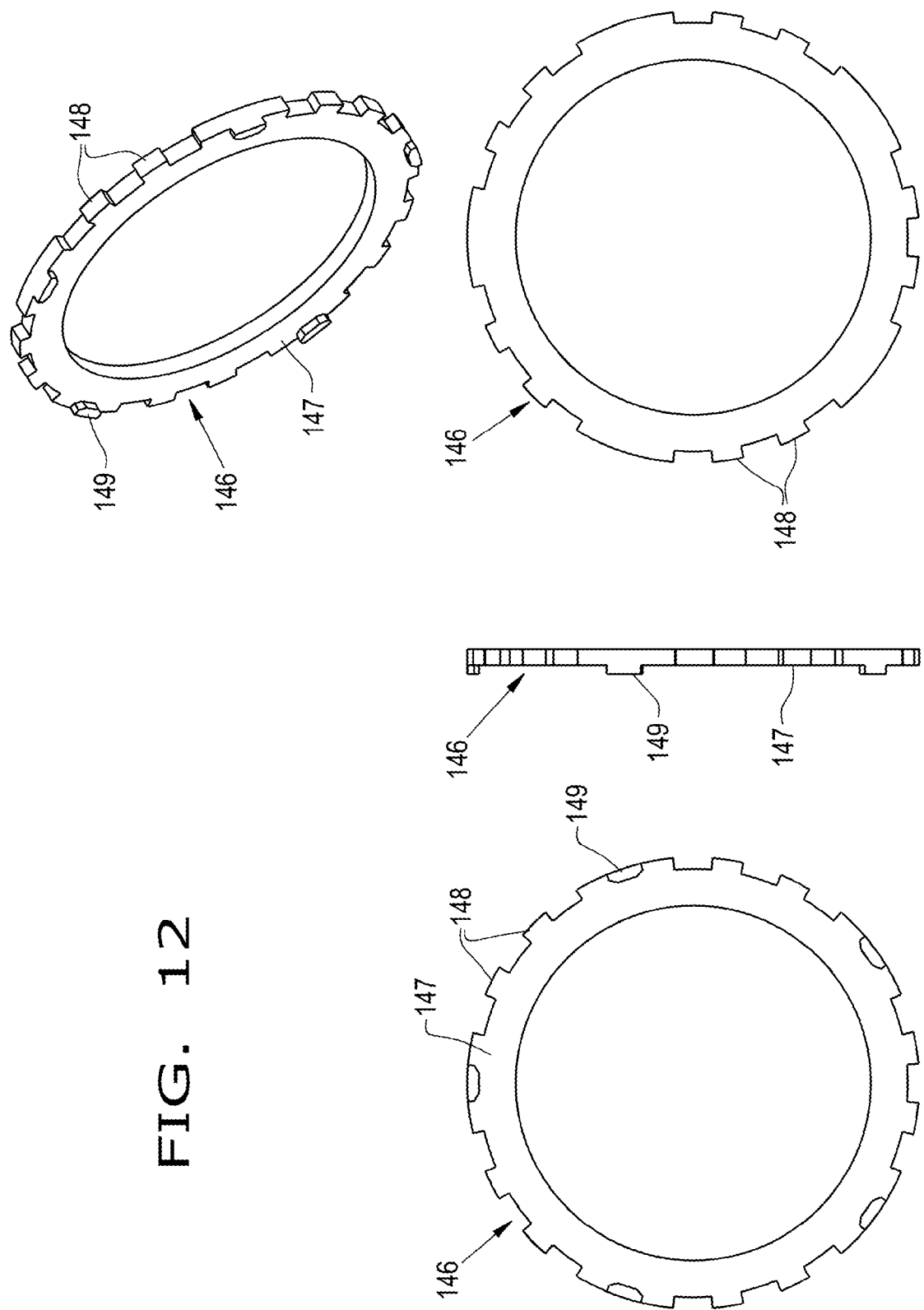
FIG. 12 contains front, rear, side, and perspective views of a stock apply plate of a type that can be installed in the stock drum of FIG. 3 or the modified drum of FIG. 1, 2, or 4.
Figure 13:
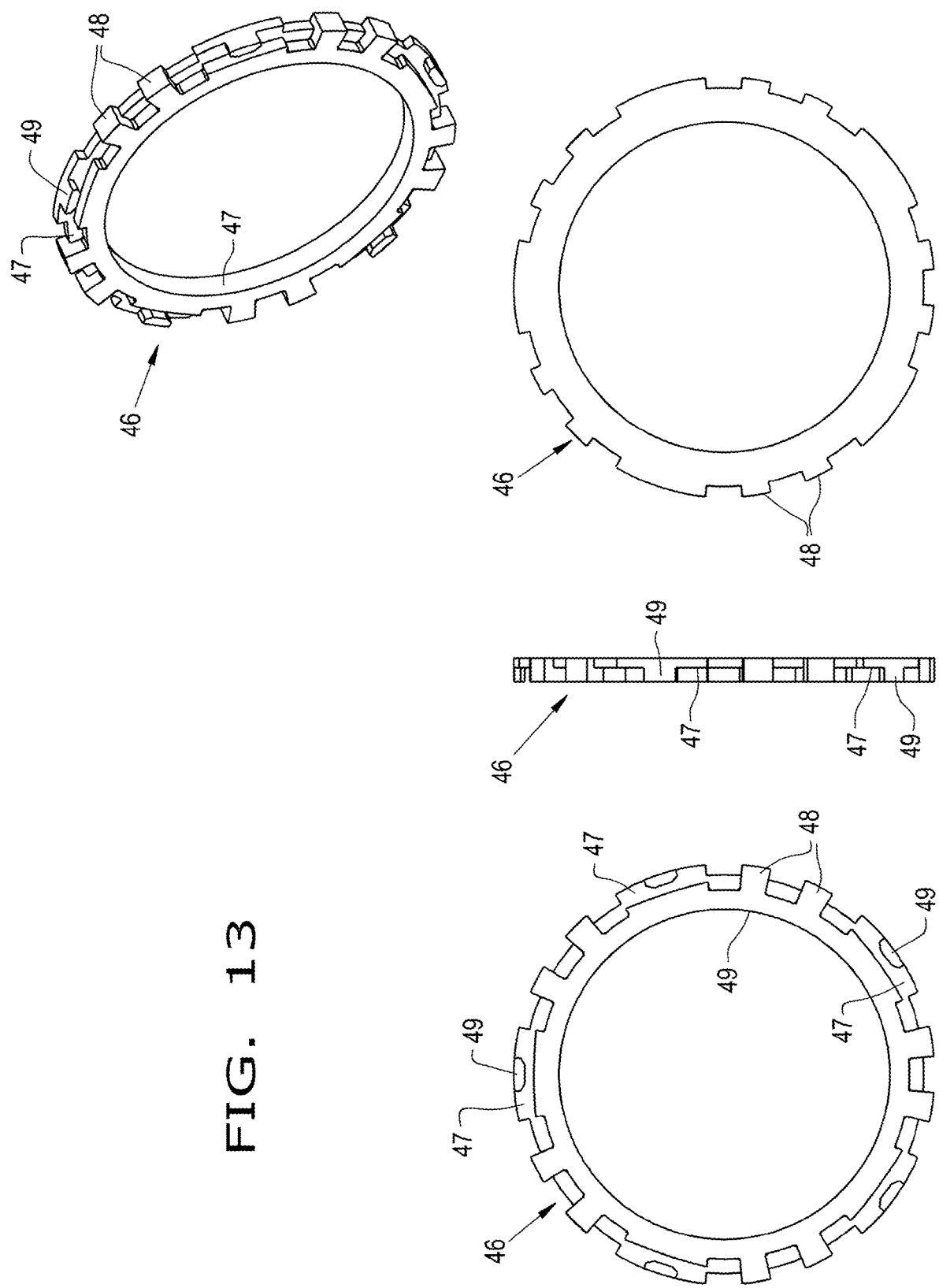
FIG. 13 schematically represents front, rear, side, and perspective views showing a modified apply plate that can be installed in the stock drum of FIG. 3 or the modified drum of FIG. 1, 2, or 4 in accordance with nonlimiting aspects of the invention.
Figure 14:
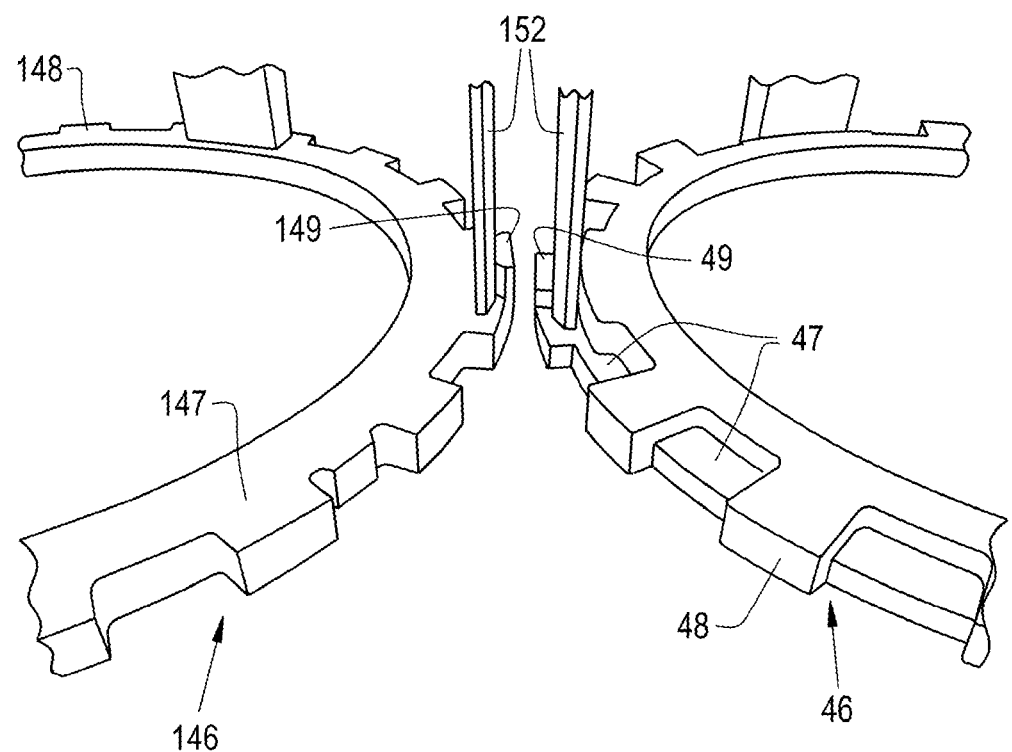
FIGS. 14 and 15 are images showing the stock and modified apply rings of FIGS. 12 and 13 assembled with stock apply rings that can be installed in the stock drum of FIG. 3 or the modified drum of FIG. 1, 2, or 4.
Figure 15:
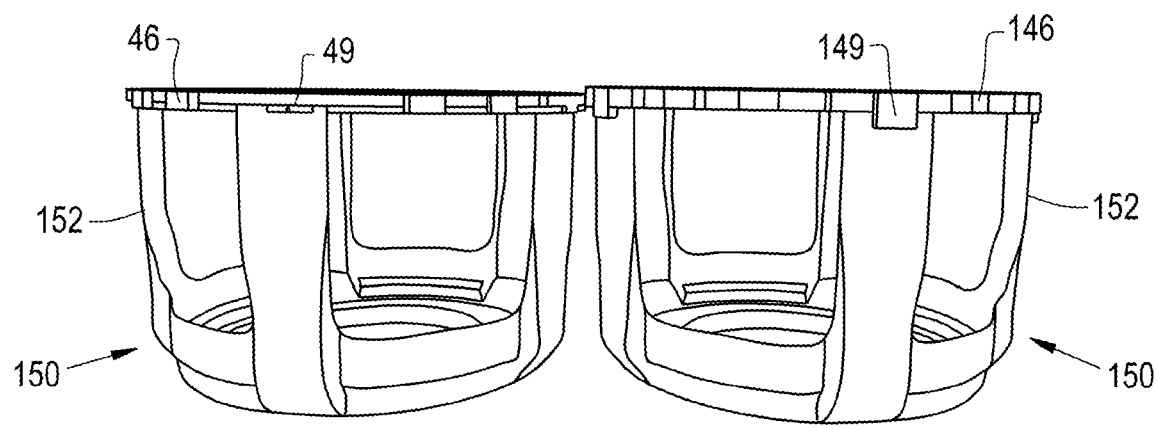

FIG. 12 schematically represents a stock apply plate 146 fabricated to cooperate with other components of a clutch assembly (for example, an apply piston) to engage or disengage an interleaved stack of the friction and driving plates (114 in FIGS. 17 and 18) within the stock drum 112 of FIG. 3 in order to enable and interrupt the transfer of power through the drum 112. The stock apply plate 146 conventionally has slotted teeth 148 on its outer diameter for mechanically coupling with slots (not shown) machined on the interior walls of the cavity portion 113*a* of the stock drum 112 of FIG. 3. The stock apply plate 146 has a face 147 against which legs of a stock apply ring (152 and 150, respectively, in FIGS. 14 and 15) abut, and tabs 149 protruding from the face 147 that restrain movement of the apply ring legs 52 as shown in FIGS. 14 and 15. Because the cavity portion 13*a* of the modified drum 12 of FIGS. 1, 2, and 4 has a larger diameter than the cavity portion 113*a* of the stock drum 112, and because the plates 14 to be installed in the modified drum 12 of FIGS. 1, 2, and 4 are intentionally manufactured to have smaller inner diameters than the stock plates 114 (FIGS. 17 and 18), FIG. 13 schematically represents a modified apply plate 46 that has extended teeth 48 at its outer diameter to match the slots 36 and internal contour of the drum 12, as well as a smaller inner diameter to more closely match the smaller inner diameters of the plates 14 to be installed in the drum 12 to provide full surface area contact with the larger friction faces 26 of the friction plates 14. Furthermore, the apply plate 46 has a recessed face 47 against which the legs 152 of the stock apply ring 150 (FIGS. 14 and 15) abut, and tabs 49 protruding from the recessed face 47 that restrain movement of the apply ring legs 52 as shown in FIGS. 14 and 15. As evident from FIGS. 12 through 15, the modified apply plate 46 is thinner where contacted by the legs 152 of the apply ring 150 as a result of the recessed surface 147, so that the apply plate 46 is able to sit deeper within the cavity 13 of the drum 12 and thereby effectively defines an internal axial extension of the drum cavity 13a (in other words, axial space within the cavity 13 of the drum 12) to create additional axial space for accommodating additional plates 14 within the cavity 13a.

Figure 19:
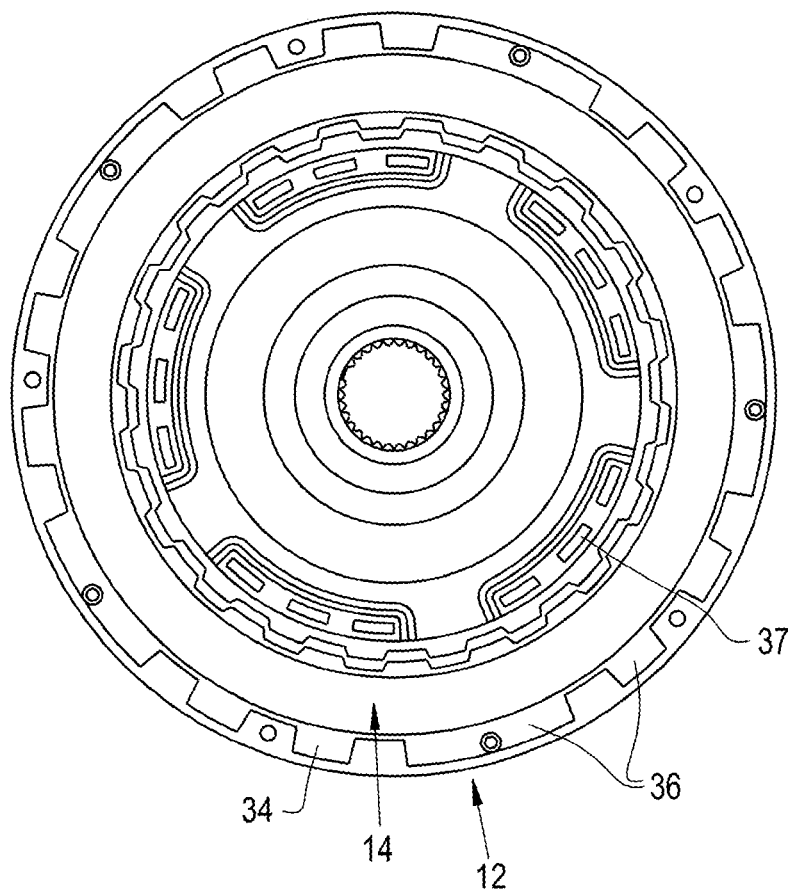
FIGS. 19 and 20 are images of the drum of FIG. 16 showing the replacement friction and driving plates of FIGS. 17 and 18 installed in the drum.
Figure 20:
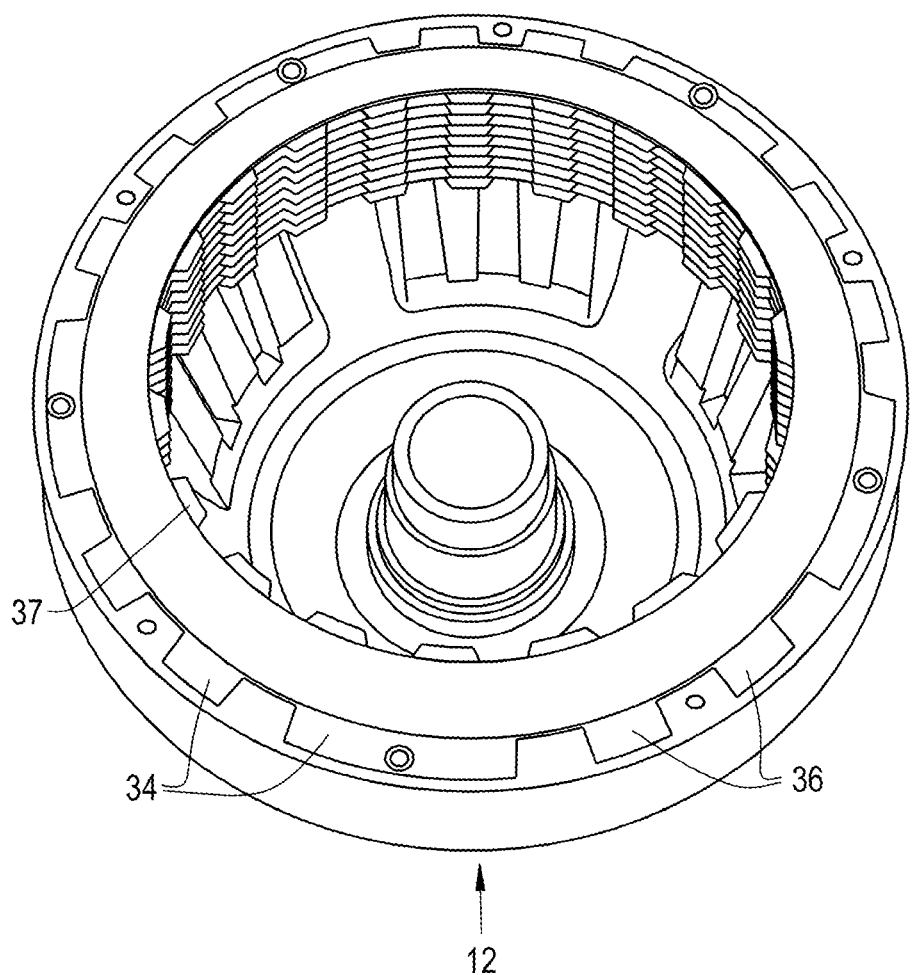
Figure 21:
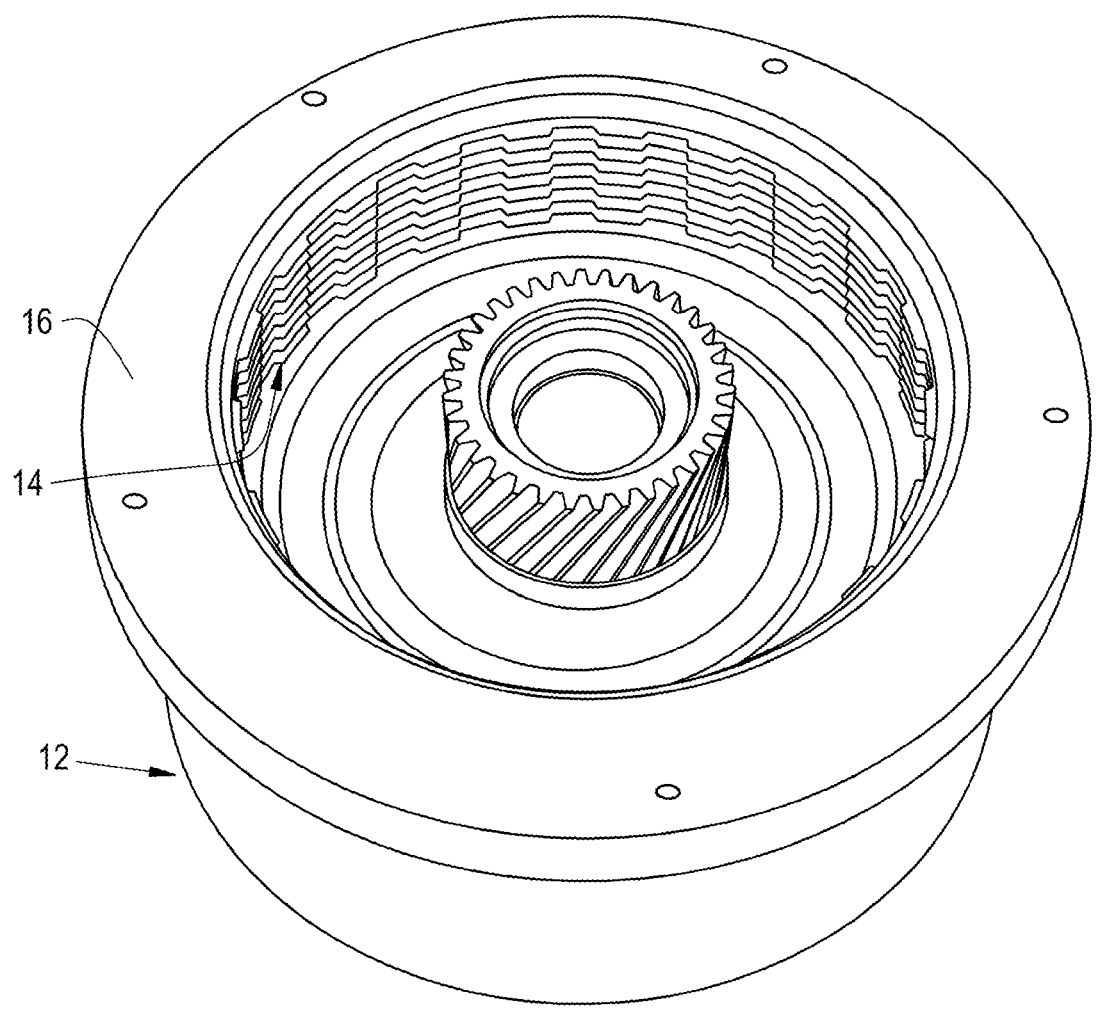
FIG. 21 is an image of the drum of FIGS. 19 and 20 showing the pressure plate of FIGS. 17 and 18 installed on the drum.

FIGS. 16 and 19 through 21 are images showing a modified drum 12 of the type shown in FIGS. 1, 2, and 4, in which a stock apply ring 150 (FIGS. 14 and 15) has been installed. FIGS. 17 and 18 are images showing a "stock" stack of interleaved stock clutch (driving and friction) plates 114, a stock apply plate 146 (FIGS. 12, 14, and 15), a stock pressure plate 116, and a stock snap ring 118, alongside a stack of interleaved modified clutch (driving and friction) plates 14, a modified apply plate 46 (FIGS. 13, 14, and 15), and a modified pressure plate 16 (FIGS. 1, 2, and 8-11). FIGS. 19 and 20 show the drum 12 of FIG. 16 after installation of the modified stack of friction and driving plates 14 of FIGS. 17 and 18, and FIG. 21 shows the pressure plate 16 installed on the drum 12 with its angular position on the drum 12 locked with the set screws 18. FIGS. 19 and 20 also show the tabs 34 of the driving plates 14 as mechanically coupled with the slots 36 of the cavity portion 13a of the drum 12.

In FIGS. 17 and 18, the stock and modified friction plates 14 and 114 are distinguishable from their counterpart stock and modified driving plates 14 and 114. The modified friction plates 14 have teeth or tabs 37 formed on their inner perimeters that are complementary to the slotted teeth 38 on the outer diameter of the modified ring gear 20 (FIG. 7) for mechanically coupling with the modified friction plates 14, whereas the modified driving plates 14 have tabs 34 on their outer perimeters for mechanically coupling with the slots 36 formed in the walls of the cavity portion 13a of the modified drum 12. Similarly, the stock friction plates 114 have teeth or tabs 137 formed on their inner perimeters that are complementary to the slotted teeth 138 on the outer diameter of the stock ring gear 120 (FIG. 6) for mechanically coupling with the friction plates 114, whereas the stock driving plates 114 have tabs 134 on their outer perimeters for mechanically coupling with slots (not shown) formed in the walls of the cavity portion 113a of the stock drum 12.

The stacks shown in FIGS. 17 and 18 represent the number of friction and driving plates 14 that can be accommodated in the modified drum 12 as a result of the modified pressure and apply plates 16 and 46, and the number of stock friction and driving plates 114 that can be accommodated in the stock drum 112 as a result of the stock pressure and apply plates 116 and 146. In comparing the stock and modified stacks, it can be seen that the modified stack contains nine friction plates 14 whereas the stock stack contains only six friction plates 114, evidencing the greater capacity for plates 14 enabled by the modified pressure and apply plates 16 and 46.

According to certain nonlimiting embodiments, the stock drum 112 can be modified by forming threads 30 around its rim 28 and increasing the internal diameter of its cavity 13a to allow assembly of the modified friction and driving plates 14, pressure plate 16, ring gear 20, and apply plate 46. Alternatively, the drum 12 could be specifically manufactured as a replacement for the stock drum 112. The plates 14, 16, and 46 and the ring gear 20 may be provided as a kit for assembly with the modified or replacement drum 12, and as such the modified plates 14, 16, and 46 and modified ring gear 20 may be referred to as replacement plates 14, 16, and 46 and a replacement ring gear 20 for the drum 12. It should be appreciated that a variety of replacement friction and driving plates 14 of various thicknesses can be provided in a kit to accommodate drums 12 of different sizes and to achieve a range of clutch clearances with the drum 12. Such a kit may be used to improve the performance of a stock clutch assembly, including increasing the upper toque limit of the assembly by increasing the number of replacement friction plates 14, increasing the friction surface areas provided by the friction faces 26 of the replacement plates 14 in proportion to stock plates installed in an equivalent stock drum, and promoting heat transfer from the plates 14 to the drum 12.

Alternatively and according to certain additional nonlimiting embodiments, the stock drum 112 can be modified by forming threads 30 around its rim 28 without increasing the internal diameter of its cavity 113a. In such an embodiment, stock friction and driving plates 114 and a stock ring gear 120 can be utilized in combination with the modified pressure plate 16 and modified apply plate 46, which allow additional stock friction and driving plates 114 to be installed as a result of the external and internal axial extensions of the drum cavity 113a created by the modified pressure and apply plates 16 and 46. As before, the modified pressure and apply plates 16 and 46 may be provided as a kit for assembly with the modified or replacement drum 12, and as such the modified plates 16 and 46 may be referred to as replacement plates 16 and 46 for the drum 12. It should be appreciated that such a kit may be used to improve the performance of a stock clutch assembly, including increasing the upper toque limit of the assembly by increasing the number of stock friction plates 114 that can be installed in proportion to the same type of stock plates installed in an equivalent stock drum 112.

While the invention has been described in terms of a specific or particular embodiment, it should be apparent that alternatives could be adopted by one skilled in the art. For example, the clutch assembly 10 and its components could differ in appearance and construction from the embodiment described herein and shown in the drawings, functions of certain components of the clutch assembly 10 could be performed by components of different construction but capable of a similar (though not necessarily equivalent) function, and various materials could be used in the fabrication of the clutch assembly 10 and its components. In addition, the invention encompasses additional or alternative embodiments in which one or more features or aspects of the disclosed embodiment could be eliminated. Accordingly, it should be understood that the invention is not necessarily limited to any embodiment described herein or illustrated in the drawings. It should also be understood that the phraseology and terminology employed above are for the purpose of describing the illustrated embodiment and do not necessarily serve as limitations to the scope of the invention. Therefore, the scope of the invention is to be limited only by the following claims.

The invention claimed is:

1. A method of modifying a clutch assembly comprising a drum and a stock apply plate and stock friction and driving plates installed in an interior cavity of the drum, the drum having a rim at an entrance to the interior cavity, the method comprising providing threads on a cylindrical surface of the drum at the rim of the drum, providing threads on a cylindrical surface of the pressure plate that are complementary to the threads of the drum, and threading the pressure plate onto the rim of the drum with the threads of the drum and the threads of the pressure plate to mate the cylindrical surfaces of the drum and the pressure plate, secure the pressure plate to the drum, and enclose the interior cavity of the drum, wherein the pressure plate has an internal recessed surface that defines an axial extension externally of the interior cavity of the drum to create additional axial space beyond the rim of the drum, the method further comprising installing additional friction and driving plates within the additional axial space beyond the rim of the drum.

2. The method according to claim 1, wherein the drum is a stock drum, the method further comprising machining the stock drum to form the threads as male threads that are complementary to the threads of the pressure plate that are formed as female threads.

3. The method according to claim 1, wherein the drum is a stock drum, the method further comprising:

machining the stock drum to increase an inner diameter of its interior cavity; and replacing the stock friction and driving plates with replacement friction and driving plates that have larger outer diameters than the stock friction and driving plates, or smaller inner diameters than the stock friction and driving plates, or larger outer diameters and smaller inner diameters than the stock friction and driving plates.

4. The method according to claim 3, wherein the clutch assembly further comprises a stock ring gear mechanically coupled to the stock friction plates, the method further comprising machining the stock ring gear to have an outer diameter sized to mechanically couple with the replacement friction plates.

5. The method according to claim 1, further comprising calibrating the extent to which the pressure plate is threaded onto the rim of the drum and thereby modifying clearances between the friction and driving plates.

6. The method according to claim 1, wherein the clutch assembly further has a stock apply ring installed in the interior cavity of the drum and the stock apply plate is installed in the interior cavity of the drum between the stock apply ring and the stock friction and driving plates and contacts one of the stock friction and driving plates, the method further comprising replacing the stock apply plate with a replacement apply plate that has a larger outer diameter than the stock apply plate, or a smaller inner diameter than the stock apply plate, or a larger outer diameter and a smaller inner diameter than the stock apply plate, and has surfaces that are contacted by legs of the stock apply ring when the stock apply ring and replacement apply plate are installed in the interior cavity of the drum.

7. The method according to claim 6, wherein the surfaces of the replacement apply plate are recessed surfaces that axially internally extend the interior cavity of the drum.

8. A method of modifying a clutch assembly comprising a stock drum, a pressure plate, and stock friction and driving plates installed in an interior cavity of the stock drum, the method comprising:

removing the stock friction and driving plates from the interior cavity of the stock drum;

producing a modified drum having a modified interior cavity by machining the stock drum to increase an inner diameter of the interior cavity thereof; and installing in the modified interior cavity of the modified drum replacement friction and driving plates that have larger outer diameters than the stock friction and driving plates;

wherein the pressure plate has an internal recessed surface that defines an axial extension externally of the modified interior cavity of the modified drum to create additional axial space beyond the rim of the modified drum, and more of the replacement friction and driving plates are installed in the modified interior cavity and the additional axial space beyond the rim than were the stock friction and driving plates installed in the interior cavity of the stock drum.

9. The method according to claim 8, wherein the replacement friction plates have smaller inner diameters than the stock friction plates and the clutch assembly further comprises a stock ring gear mechanically coupled to the stock friction plates, the method further comprising machining the stock ring gear to have an outer diameter sized to mechanically couple with the replacement friction plates.

10. The method according to claim 8, wherein the modified drum has a rim at an entrance to the modified interior cavity thereof, the method further comprising providing threads on a cylindrical surface of the modified drum at the rim thereof, providing threads on a cylindrical surface of the pressure plate that are complementary to the threads of the modified drum, and threading the pressure plate onto the rim of the modified drum with the threads of the modified drum and the threads of the pressure plate to mate the cylindrical surfaces of the modified drum and the pressure plate, secure the pressure plate to the modified drum, and enclose the modified interior cavity of the modified drum.

11. The method according to claim 10, the method further comprising machining the modified drum to form the threads as male threads that are complementary to the threads of the pressure plate that are formed as female threads.

12. The method according to claim 10, further comprising calibrating the extent to which the pressure plate is threaded onto the rim of the modified drum and thereby modifying clearances between the replacement friction and driving plates.

13. The method according to claim 8, wherein the clutch assembly further has a stock apply ring installed in the interior cavity of the stock drum and a stock apply plate installed in the interior cavity of the stock drum between the stock apply ring and the stock friction and driving plates and contacting one of the stock friction and driving plates, the method further comprising replacing the stock apply plate with a replacement apply plate having recessed surfaces that are contacted by legs of the stock apply ring when the stock apply ring and the replacement apply plate are installed in the modified interior cavity of the modified drum.

14. The method according to claim 13, wherein the recessed surfaces of the replacement apply plate axially internally extend the modified interior cavity of the modified drum.

15. The method according to claim 3, wherein the clutch assembly further comprises a stock ring gear mechanically coupled to the stock friction plates, the method further comprising reinstalling the stock ring gear in the modified interior cavity of the modified drum.

* * * * *